(12) United States Patent
Chen et al.

(10) Patent No.: US 10,579,102 B2
(45) Date of Patent: Mar. 3, 2020

(54) DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Gaowei Chen, Beijing (CN); Jiaqiang Wang, Beijing (CN); Yanchao Zhang, Beijing (CN); Jianwu Wu, Beijing (CN); Jianye Tang, Beijing (CN); Desheng Xiang, Beijing (CN); Shuainan Liu, Beijing (CN); Junjie Xu, Beijing (CN); Fuan Zhu, Beijing (CN)

(73) Assignees: BEIJING BOE OPTOELECTRONICS TECHNOLOGY CO., LTD., Beijing (CN); BOE TECHNOLOGY TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/107,217

(22) Filed: Aug. 21, 2018

(65) Prior Publication Data
US 2019/0302847 A1    Oct. 3, 2019

(30) Foreign Application Priority Data
Apr. 2, 2018   (CN) .......................... 2018 1 0282604

(51) Int. Cl.
*G06F 1/16*    (2006.01)
*G06K 9/00*    (2006.01)

(52) U.S. Cl.
CPC .......... *G06F 1/1647* (2013.01); *G06F 1/1605* (2013.01); *G06F 1/1624* (2013.01); *G06F 1/1652* (2013.01); *G06F 1/1686* (2013.01); *G06K 9/0002* (2013.01); *G06K 9/00087* (2013.01)

(58) Field of Classification Search
CPC .... G06F 1/1647; G06F 1/1605; G06F 1/1624; G06F 1/1652; G06F 1/1686; G06K 9/0002; G06K 9/00087
See application file for complete search history.

(56) References Cited

U.S. PATENT DOCUMENTS

| | | | |
|---|---|---|---|
| 9,229,491 B2 * | 1/2016 | Kim ...................... | G06F 1/1698 |
| 2006/0110013 A1 * | 5/2006 | Lee ........................ | G06F 3/0237 |
| | | | 382/115 |
| 2010/0331052 A1 * | 12/2010 | Watanabe ............. | G06F 1/1624 |
| | | | 455/566 |

(Continued)

*Primary Examiner* — Hoa C Nguyen
*Assistant Examiner* — Keith DePew
(74) *Attorney, Agent, or Firm* — Kinney & Lange, P.A.

(57) ABSTRACT

A display device includes: a device body; a first display screen; and a second display screen, wherein the device body includes a first region for receiving the first display screen and a second region for receiving the second display screen, and the first display screen and the second display screen collectively cover a surface of the device body, and wherein the second region is provided with at least one functional module, and the second display screen is movable relative to the device body to expose or cover the at least one functional module.

10 Claims, 3 Drawing Sheets

(56) References Cited

U.S. PATENT DOCUMENTS

| | | | | |
|---|---|---|---|---|
| 2011/0006971 A1* | 1/2011 | Ebey | G06F 1/1616 | 345/1.3 |
| 2011/0009169 A1* | 1/2011 | Kim | G06F 1/1624 | 455/566 |
| 2011/0012931 A1* | 1/2011 | Abe | G06F 1/1624 | 345/671 |
| 2011/0117971 A1* | 5/2011 | Kim | G06F 1/1647 | 455/566 |
| 2011/0128241 A1* | 6/2011 | Kang | G06F 1/1643 | 345/173 |
| 2011/0199361 A1* | 8/2011 | Shin | G06F 1/1616 | 345/211 |
| 2012/0094725 A1* | 4/2012 | Matsumoto | G06F 1/1624 | 455/566 |
| 2012/0098773 A1* | 4/2012 | Kobayashi | G06F 1/1624 | 345/173 |
| 2012/0100893 A1* | 4/2012 | Jung | H04M 1/0237 | 455/566 |
| 2012/0262887 A1* | 10/2012 | Park | G06F 1/1624 | 361/749 |
| 2012/0306782 A1* | 12/2012 | Seo | G06F 1/1616 | 345/173 |
| 2013/0012273 A1* | 1/2013 | Sato | G06F 1/1624 | 455/566 |
| 2013/0021379 A1* | 1/2013 | Sirpal | G06F 1/1616 | 345/659 |
| 2013/0024807 A1* | 1/2013 | Kobayashi | H04M 1/0237 | 715/781 |
| 2013/0196718 A1* | 8/2013 | Tani | G01C 21/20 | 455/566 |
| 2013/0235096 A1* | 9/2013 | Liu | G09G 5/30 | 345/697 |
| 2014/0101578 A1* | 4/2014 | Kwak | G06F 3/017 | 715/761 |
| 2015/0220299 A1* | 8/2015 | Kim | G06F 3/0488 | 345/1.3 |
| 2016/0070303 A1* | 3/2016 | Lee | G06F 1/1616 | 361/679.27 |
| 2018/0007182 A1* | 1/2018 | Lin | G06F 1/1652 | |
| 2018/0198896 A1* | 7/2018 | Kang | H04M 1/02 | |
| 2019/0004764 A1* | 1/2019 | Son | G06F 3/147 | |

\* cited by examiner

DISPLAY DEVICE

CROSS-REFERENCE TO RELATED APPLICATION

This application claims the priority benefit of Chinese Patent Application No. 201810282604.8 filed on Apr. 2, 2018 in the State Intellectual Property Office of China, the disclosure of which is incorporated herein by reference in entirety.

BACKGROUND

Embodiments of the present disclosure relate to the field of display technology, and in particular, to a display device.

Full screen (bezel-less) displays has become a development trend of electronic display devices such as mobile phones. The full screen display brings challenges to traditional display devices. In particular, it is necessary for the electronic device such as a mobile phone to provide a fingerprint recognition structure and a front camera thereon, which affects the full screen implementation on the electronic display devices.

SUMMARY

At least one of embodiments of the present disclosure provides a display device, comprising: a device body; a first display screen; and a second display screen, wherein the device body comprises a first region for receiving the first display screen and a second region for receiving the second display screen, and the first display screen and the second display screen collectively cover a surface of the device body, and the second region is provided with at least one functional module, and the second display screen is movable relative to the device body to expose or cover the at least one functional module.

As an alternative embodiment, the display device further comprises a sliding mechanism, wherein the second display screen is configured to slide along the device body by the sliding mechanism to expose or cover the at least one functional module.

As an alternative embodiment, the at least one functional module is selected from one or more of a camera module, a first fingerprint recognition module and a second fingerprint recognition module.

As an alternative embodiment, the second display screen is configured to slide in a widthwise direction or longitudinal direction of the device body.

As an alternative embodiment, the second display screen is a flexible display screen.

As an alternative embodiment, a portion of the second display screen is configured to slide to a surface of the device body facing away from the first display screen in the widthwise direction of the device body, to expose the at least one functional module.

As an alternative embodiment, the second display screen comprises an extension portion extending along a side of the device body, the extension portion being located at the side of the device body or extending along the side of the device body to a surface of the device body facing away from the first display screen; and wherein the extension portion is provided with at least one through hole, and the second display screen is configured to slide relative to the device body to expose the at least one functional module from the at least one through hole.

As an alternative embodiment, at least a portion of the second display screen is configured to outwardly slide beyond a side of the device body in parallel to the surface of the device body.

As an alternative embodiment, the second region of the device body is provided with a camera module and a first fingerprint recognition module; and wherein the camera module and the first fingerprint recognition module are respectively disposed on two sides of the second region in a widthwise direction of the device body; or wherein the camera module and the first fingerprint recognition module are both disposed on one side of the second region in the widthwise direction of the device body; or wherein the camera module is disposed in a central area of the second region, and the first fingerprint recognition module is disposed on one side of the second region in the widthwise direction of the device body.

As an alternative embodiment, the second region of the device body is further provided with a second fingerprint recognition module, and the second fingerprint recognition module is disposed at an end of the second region of the device body facing away from the first fingerprint recognition module.

As an alternative embodiment, the sliding mechanism comprises a rail slot disposed in the device body and a rail disposed on the second display screen and matched with the rail slot; or the sliding mechanism comprises a rail slot disposed in the second display screen and a rail disposed in the device body and matched with the rail slot.

As an alternative embodiment, the rail slot disposed in the device body comprises a first rail slot extending in a widthwise direction of the device body or a second rail slot extending in a longitudinal direction of the device body.

As an alternative embodiment, the display device further comprises a control module for controlling display states of the first display screen and the second display screen.

As an alternative embodiment, the control module is configured to set both the first display screen and the second display screen as display regions, or to set the first display screen as a display region and the second display screen as a control region or a non-display region, when a picture is displayed.

As an alternative embodiment, the control module controls the second display screen to work individually when the display device is in a standby state.

As an alternative embodiment, the control module is configured to set the second display screen as a control region, and control a display state of the first display screen according to operation of the second display screen by a user.

As an alternative embodiment, a surface of the first display screen is flush with a surface of the second display screen.

As an alternative embodiment, a size of the second display screen in a widthwise direction of the device body when being expanded in the widthwise direction is greater than a size of the device body in the widthwise direction.

As an alternative embodiment, a stopping portion is provided on a surface of the device body facing away from the first display screen for blocking sliding of the second display screen.

As an alternative embodiment, the first fingerprint recognition module and the second fingerprint recognition module are each selected from a capacitive fingerprint recognition module, an ultrasonic fingerprint recognition module and an optical fingerprint recognition module.

BRIEF DESCRIPTION OF THE DRAWINGS

The embodiments of the present disclosure will be further described in detail with reference to the accompanying drawings below.

DETAILED DESCRIPTION

Figure 1:
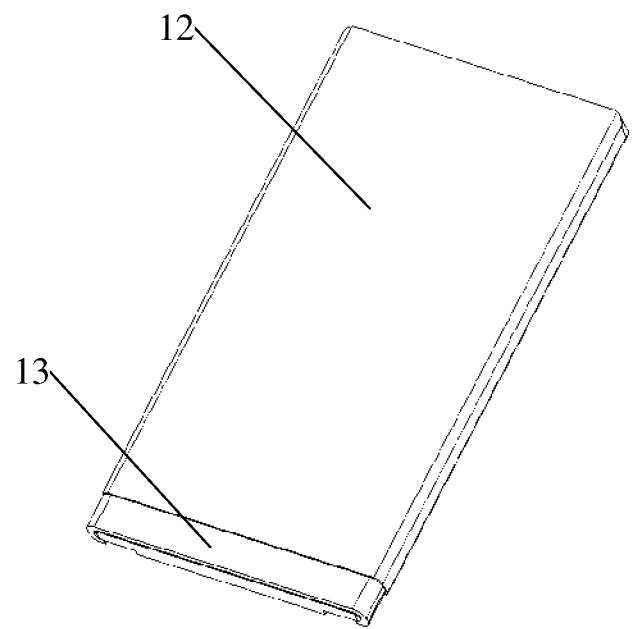
FIG. 1 is a front schematic view of a display device according to an embodiment of the present disclosure.

In order to more clearly illustrate the embodiments of the present disclosure, the present disclosure will be further described with reference to exemplary embodiments and accompanying drawings. Similar components in the drawings are denoted by the same reference numeral. It should be appreciated by those skilled in the art that the following specific description is illustrative but not restrictive, therefore it should not regarded to limit the scope of the present disclosure.

At present, full-screen mobile phones have become a researching focus of mainstream mobile phone manufacturers. However, full screen display of the full screen mobile phones has brought challenges to the traditional mobile phone structure. The requirement of high screen-to-body ratio means that positions of functional modules such as a telephone receiver, an infrared sensor, a front fingerprint recognition module, a front camera and other main functional devices need to be redesigned. The conventional telephone receiver can be replaced by a piezoelectric ceramic, the infrared sensor which is used for avoiding accidental touch can be replaced by an ultrasonic sensor, and they can be built beside a side of a display screen. However, in view of the importance of the front fingerprint recognition module and the front camera, these two components are usually provided on the electronic display device. The conventional full-screen fingerprint recognition module usually adopts a scheme of providing the fingerprint recognition module on a back side of the mobile phone, which does not conform to the user' habits. The camera module in the full screen design is either placed in a slot in the middle of the screen on the top of the mobile phone, or is placed at the bottom of the screen with a reduced screen-to-body ratio. However, such a design may result in a smaller screen-to-body ratio or a worse aesthetic effect. Therefore, it is necessary to provide a new display device capable of realizing full screen display, providing a feasible setting scheme for the functional modules such as fingerprint recognition module and camera module, adapting to the user's operating habits, and improving the user's operating experiences.

Figure 2:
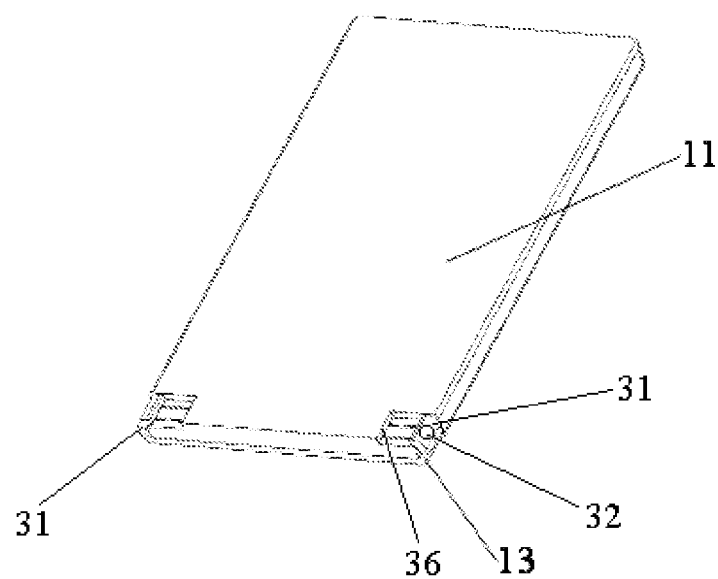
FIG. 2 is a rear schematic view of a display device according to an embodiment of the present disclosure.
Figure 3:
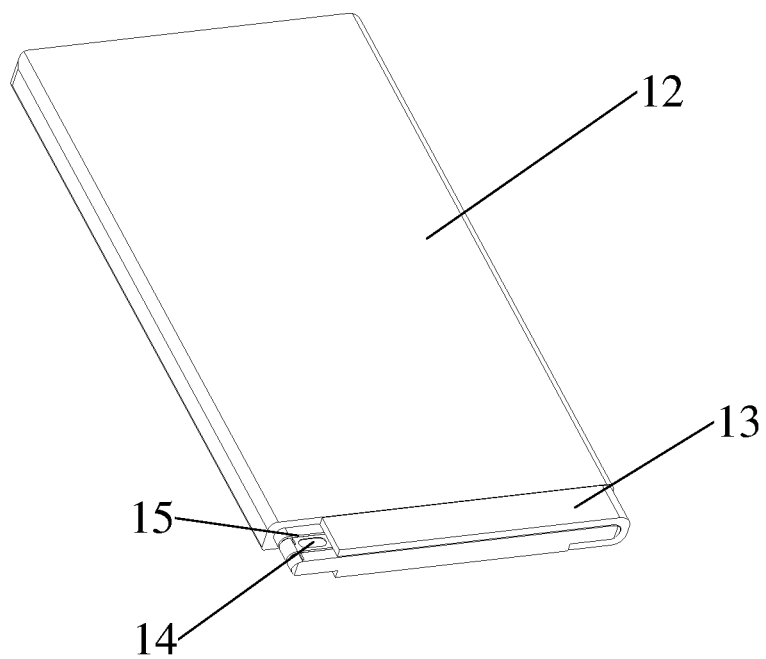
FIG. 3 is a rear schematic view of a display device in which a second display screen has been slid relative to a device body to expose a functional module according to an embodiment of the present disclosure.

FIGS. 1-3 are schematic views of a display device according to an embodiment of the present disclosure. As shown in FIG. 1 and FIG. 2, in this embodiment, the display device includes a device body 11, a first display screen 12, and a second display screen 13. The first display screen 12 and the second display screen 13 collectively cover a surface of the device body 11, thereby the screen-to-body ratio is increased to realize a full screen display.

For convenience of description, it is defined that a surface of the device body 11 provided with the first display screen 12 is a front surface of the device body 11, and a surface of the device body 11 opposite to the first display screen 12 is a rear surface of the device body 11, a longitudinal direction of the device body 11 is a first direction, and a widthwise direction of the device body 11 is a second direction, but such a definition does not constitute a limitation to the present disclosure. In the full-screen display device according to the embodiments of the present disclosure, an edge of the first display screen is flush with an edge of the device body such that the width of the first display screen is the same as the width of the device body.

The device body 11 includes a first region covered by the first display screen 12 and a second region covered by the second display screen 13. At least one functional module is provided on the second region. The at least one functional module may be selected from one or more of a camera module disposed on the same side as the first display screen 12, a first fingerprint recognition module 14 disposed on the same side as the first display screen 12, and a second fingerprint recognition module disposed on the same side as the first display screen 12. Herein, the optional function modules may further include an infrared heart rate module, a facial recognition module, an iris recognition module or the like.

The first fingerprint recognition module 14 and the second fingerprint recognition module may be selected from various types of fingerprint recognition modules, such as a capacitive fingerprint recognition module, an ultrasonic fingerprint recognition module or an optical fingerprint recognition module, and the camera module may include at least one camera.

As shown in FIG. 3, in this embodiment, the camera module and the first fingerprint recognition module 14 are disposed on the device body, and the first fingerprint recognition module 14 is disposed on a side of the second region of the device body close to a side of the device body, and the camera module is disposed on the other side of the second region of the device body. The second display screen can be slid towards any sides in the second direction to expose the camera module or the first fingerprint recognition module 14. The positions of the camera module and the first fingerprint recognition module 14 can be interchanged.

In the embodiment of the present disclosure, the functional modules such as the camera module and the fingerprint recognition module may be disposed at any positions in the second region of the device body. The second display screen is arranged in such a way that the functional modules can be exposed or covered when the second display screen slides along the device body. This embodiment only schematically illustrates the type and arrangement mode of the functional modules, but does not limit the scope of the present disclosure.

In this embodiment, the default position of the second display screen 13 is designed so that it covers the front surface of the device body 11 together with the first display screen 12, and the second display screen covers the camera module and the fingerprint recognition module on the device body. When the second display screen slides in the second direction, one side of the second display screen 13 can slide to the rear surface of the device body 11 along the side of the device body, while the other side of the second display screen 13 departs from the original position to expose the camera module or the fingerprint recognition module originally covered by the second display screen 13, thereby the display device can automatically activate the functional module based on the exposed state of the camera module or the fingerprint recognition module or activate the functional module by a user's operation, to realize the function corresponding to the functional module.

An object of the embodiments of the present disclosure is to provide a display device that provides a feasible scheme for providing the functional modules such as a camera module and a front fingerprint recognition module in the full screen display device, thereby improving user's experience.

In this embodiment, the second display screen 13 is a flexible display screen. The flexible display screen has a bendable characteristic, and it can be arranged to bend along the surface of the device body 11 to meet the functional requirement that the second display screen 13 can slide along the surface of the device body 11.

In an alternative embodiment, at least one camera module or fingerprint recognition module may be further provided on the rear surface of the device body, which is not limited in the present disclosure.

In this embodiment, an outer edge of the functional module is flush with the side of the device body 11, so that the first fingerprint recognition module 14 can be exposed by the sliding of the second display screen 13, and the sliding distance of the second display screen 13 is reduced, thereby simplifying the operation.

As an alternative embodiment, the second region of the device body 11 is further provided with at least one set of sliding mechanism that can be used for sliding the second display screen 13 relative to the device body 11. The second display screen 13 can slide relative the device body 11 by the sliding mechanism, to expose or cover the at least one functional module.

In this embodiment, the sliding mechanism is a rail slot 15 provided on the device body 11, and the second display screen 13 is provided with a rail matched with the rail slot 15. In other embodiments, the sliding mechanism may also be a rail provided on the device body 11, and the second display screen 13 is provided with a rail slot 15 matched with the rail on the device body 11, to realize the sliding of the second display screen relative to the device body. Forming the rail slot 15 and the rail on the device body and the second display screen to enable the second display screen to slide relative to the device body can be realized by the prior art. Herein, the rail slot 15 or the rail is only a specific example of the sliding mechanism. In practical applications, other types of sliding mechanisms can also be used, which is not limited in the present disclosure.

In this embodiment, a size of the second display screen 13 in the second direction when being expanded in the second direction is greater than a width of the device body 11. In a default state, at least one side of the second display screen 13 extends from the front surface of the device body 11 to the back surface of the device body 11 so that the second display screen 13 can stably slide. In this embodiment, both sides of the second display screen 13 in the second direction extend from the front surface of the device body 11 to the back surface of the device body 11, and correspondingly, the sliding mechanism extends from the front surface of the device body 11 to the back surface of the device body 11. In this embodiment, the rail slot 15 extends correspondingly to the back surface of the device body 11.

In other embodiments, the width of the second display screen may be the same as that of the first display screen, and two side edges of the second display screen in the second direction are flush with the sides of the device body to reduce the size of the second display screen, thereby saving costs. In this way, by means of the rail slot 15 extending to the back surface, it is still possible to slide the second display screen relative to the device body to expose the functional module.

In this embodiment, the second region of the device body 11 is further provided with a stepped portion for accommodating the second display screen 13 such that the side and the rear surfaces of the second display screen 13 are flush with the outer side surfaces of the device body 11 and the upper surface of the second display screen is flush with the first display screen, thereby achieving the aesthetic effect of the display device. The stepped portion extends from the front surface of the device body 11 to the rear surface of the device body 11. The stepped portion is provided to accommodate the second display screen 13 without hindering the sliding of the second display screen 13. Of course, in an alternative embodiment, the edge of the stepped portion can also serve as a sliding boundary of the second display screen 13, to block further sliding of the second display screen 13. For example, a stopping portion 36 is provided on the surface of the device body facing away from the first display screen for blocking the sliding of the second display screen.

Figure 4:
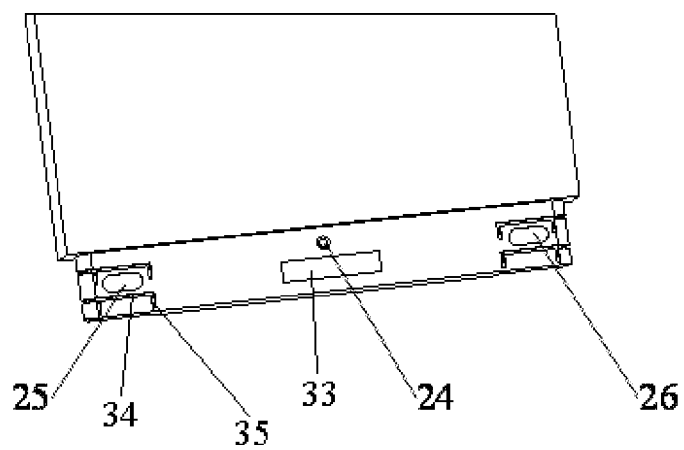
FIG. 4 is a schematic view of a device body of a display device according to an embodiment of the present disclosure.

As an alternative embodiment, the device body 11 may further include a control module 33 capable of controlling display states of the first display screen 12 and the second display screen 13, referring to FIG. 4

The control module 33 may be configured to set both the first display screen 12 and the second display screen 13 as display regions, or to set the first display screen 12 as a display region and the second display screen 13 as a control region or a non-display region, when a picture is displayed. In this way, it can realize full screen or non-full screen display according to user's requirements. In the full screen display, the first display screen 12 may be set to implement the normal display of pictures, and the second display 13 serves for function selection, displaying software icons, a home button, a return button or function buttons (such as short message button, phone button or contact list button) in the bottom of the display device. By means of providing two screens in one device, the two screens are coordinated with each other to display, thereby the operating experience is improved. In the case of non-full screen display, video or pictures can be played on the larger screen, and the smaller screen is set in a black state. Alternatively, other split screen functions can be realized.

In a standby state, the control module 33 may control the second display screen 13 to work individually. In the situation that the screen should be lighted, such as displaying an incoming call or reminding the user of a short message, the smaller screen can be set to work, thereby the power consumption can be greatly reduced, and the endurance capability of battery can be improved. The control module may also set the second display screen 13 as a control region and control the display state of the first display screen 12 according to the operation of the second display screen 13 by the user. In addition, the mechanical sliding unlocking manner in which the second display screen 13 slides relative to the device body 11 can improve the user's experience, and improve the operating experience of smart touch screen cell phones, PADs, and other display devices.

Figure 5:
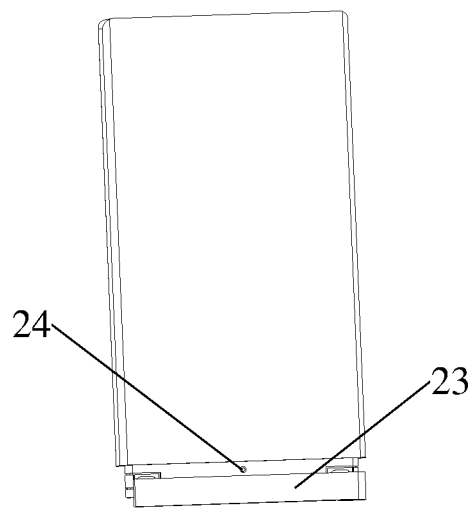
FIG. 5 is a schematic view of a display device according to an embodiment of the present disclosure.
Figure 6:
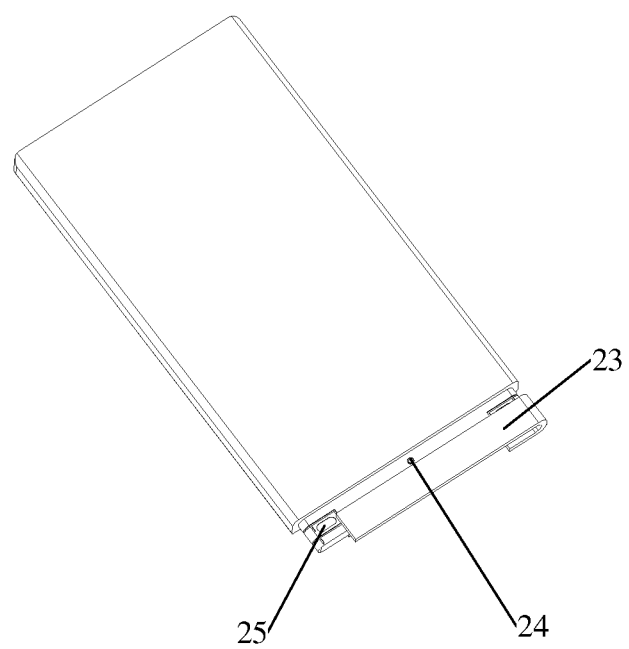
FIG. 6 is a schematic view of a display device according to an embodiment of the present disclosure.

FIGS. 4-6 are schematic views of a display device according to an embodiment of the present disclosure. In this embodiment, the camera module is disposed at a central area of the front surface of the device body, and the first fingerprint recognition module is disposed on one side of the second region of the device body close to a side of the device body. In an alternative embodiment, the positions of the camera module and the first fingerprint recognition module may be interchanged.

As an alternative embodiment, the rail slot may be provided in such a way that the second display screen can slide in the first direction or the second direction to expose the camera module and the fingerprint recognition module respectively. For example, the rail slot disposed on the device body includes a first rail slot 34 extending in the widthwise direction of the device body and/or a second rail slot 35 extending in the longitudinal direction of the device body. As a further alternative embodiment, by setting the rail slot, the second display screen is allowed to slide in the first direction at first and then slide in the second direction, or slide in the second direction at first and then slide in the first direction, to simultaneously expose the fingerprint recognition module and the camera module.

As shown in FIG. 4, the camera module 24 is disposed at the central area of the front surface of the device body, and the first fingerprint recognition module 25 and the second fingerprint recognition module 26 are respectively located at two sides of the second region of the device body close to the sides of the device body.

As shown in FIG. 5, when the second display screen is slid down, the camera module may be exposed; and when the second display screen is slid towards the right or the left, the first fingerprint recognition module 25 and the second fingerprint recognition module 26 may be respectively exposed. As shown in FIG. 6, when the second display screen is slid downward at first and then towards the right, or slid towards the right at first and then downward along the rail slot, the camera module and the first fingerprint recognition module 25 may be simultaneously exposed; when the second display screen is slid downward at first and then towards the left, or slid towards the left at first and then downward along the rail slot, the camera module 24 and the second fingerprint recognition module 26 may be simultaneously exposed.

The central area of the front surface of the device body is provided with the camera module 24. While the camera module 24 is not enabled, the second display screen 23 covers the camera module 24, and it also protects the camera module 24 to a certain extent, preventing damage.

In this embodiment, the two ends of the second display screen in the second direction respectively extend to the rear surface of the device body along the sides of the device body. In other embodiments, the stepped portion may be provided such that one side of the second display screen provided with the function module is flush with the side of the device body, or both sides of the second display screen are flush with the sides of the device body, i.e., the width of the second display screen is the same as the width of the first display screen. Other configurations of the display device according to this embodiment are similar to the previous embodiments, and therefore they will not be described in detail herein.

As a further improvement to the display device according to the previous embodiment, the display device according to this embodiment further includes a second fingerprint recognition module, and the first fingerprint recognition module and the second fingerprint recognition module are respectively located at both sides of the second region of the device body close to the sides of the device body, to meet different usage habits for the user's left and right hands. For example, when the mobile phone is held by a hand of the user, the first fingerprint recognition module proximate to the user's left hand and the second fingerprint recognition module proximate to the user's right hand may be respectively used to perform fingerprint recognition using the left hand or the right hand. In this way, the fingerprint recognition of the user can be done more conveniently and rapidly. The camera module is located at the central area of the second region of the device body. In other embodiments, the positions of the first fingerprint recognition module, the second fingerprint recognition module, and the camera module may be interchanged. Other configurations of the display device according to this embodiment are similar to the previous embodiments, and therefore they will not be described in detail herein.

As a further improvement to the display device according to the embodiment shown in FIGS. 1-3, only one side of the two sides of the second region of the device body close to the sides of the device body is provided with functional modules, specifically, the camera module and the first fingerprint recognition module are both disposed on one side of the second region.

In an alternative embodiment, it can be configured in such a way that one end of the second display screen facing away from the functional module extends to the rear surface of the device body along the side of the device body, and one end of the second display screen close to the functional module is flush with the side of the device body. In this way, the side of the second display screen facing away from the functional module may be slid to expose the functional module disposed on the other side. Other configurations of the display device according to this embodiment are similar to the embodiment shown in FIGS. 1-3, and therefore details of them will be omitted herein.

As a further improvement to the display device according to the embodiment shown in FIGS. 1-3, the device body may further be provided with a second finger recognition module, and the first fingerprint recognition module and the second fingerprint recognition module may be respectively disposed at both sides of the second region of the device body close to the sides of the device body, and the camera module is disposed on the same side as the first fingerprint recognition module or the second fingerprint recognition module. Other configurations of the display device according to this embodiment are similar to the embodiment shown in FIGS. 1-3, and therefore details of them will be omitted herein.

As a further improvement to the display device according to the previous embodiments, the second display screen may slide in the second direction parallel to the front surface of the device body, and one side of the second display screen is beyond the device body and the other side exposes the covered functional module. In this way, the second display screen does not need to bend, which can reduce the requirements on the structure of the second display screen and reduce the costs.

At the same time, the stepped portion for receiving the second display screen may be only provided on the front surface of the device body so that an upper surface of the second display screen is flush with an upper surface of the first display screen, satisfying the aesthetic effect of the display device. Other configurations of the display device according to this embodiment are similar to the previous embodiments, and therefore details of them will be omitted herein.

As a further improvement to the display device according to the previous embodiments, in the display device of the embodiment, the second display screen includes an extension portion 31 extending along the side of the device body, and the extension portion 31 is located at the side of the device body or extending along the side of the device body to the side of the device body facing away from the first display screen. In an alternative embodiment, the second display screen may even be an annular display screen. The extension portion is provided with at least one through hole 32, and the second display screen is configured to slide relative to the device body to expose the at least one functional module from the at least one through hole 32, referring to FIG. 2. The second display screen may slide relative to the device body to allow the at least one through hole of the second display screen to slide into the position of the front surface of the device body corresponding to the fingerprint recognition module and the camera module, to expose the fingerprint recognition module and the camera module disposed on the front surface of the device body. Other configurations of the display device according to this embodiment are similar to the previous embodiments, and therefore details of them will be omitted herein.

The benefits of the embodiments of the present disclosure are provided as follows:

The embodiments of the present disclosure provide a display device that can achieve a full screen display. The display device includes a device body, and a first display screen and a second display screen collectively covering a surface of the device body, the device body may be provided with a control module that controls the first display screen and the second display screen, it may control the first display screen and the second display screen to collectively display a picture, i.e., the first display screen and the second display screen form a full screen. By setting the second display screen to be capable of sliding along the surface of the device body, and setting the function module in the corresponding position of the device body, the function module on the device body may be exposed by sliding the second display screen, thereby achieving the corresponding function, providing a feasible scheme for providing the camera module and the front fingerprint recognition module that are convenient to use for the users in the full screen.

It should be apparent that the above-described embodiments of the present disclosure are merely illustrative, rather than to limit the embodiments of the present disclosure. It would be understood by those skilled in the art that other modifications or variations may be made without departing from the foregoing description. It is not intended to present all the embodiments, and any modifications or variations obtained obviously based on the embodiments of the present disclosure fall within the scope of the present disclosure.

The invention claimed is:

1. A display device, comprising:
   a device body;
   a first display screen;
   a second display screen which is independent from the first display screen; and
   a sliding mechanism,
   wherein the device body comprises a first region for receiving the first display screen and a second region for receiving the second display screen, and the first display screen and the second display screen collectively cover a surface of the device body,
   wherein the second region is provided with at least one functional module, and the second display screen is slidable relative to the first display screen to expose or cover the at least one functional module,
   wherein the second display screen is configured to slide along the device body by the sliding mechanism to expose or cover the at least one functional module,
   wherein the at least one functional module is selected from one or more of a camera module, a first fingerprint recognition module and a second fingerprint recognition module,
   wherein the second display screen is configured to slide in a widthwise direction or longitudinal direction of the device body, and
   wherein the second display screen is a flexible display screen.

2. The display device according to claim 1, wherein a portion of the second display screen is configured to slide to a surface of the device body facing away from the first display screen in the widthwise direction of the device body, to expose the at least one functional module.

3. The display device according to claim 1, wherein the second display screen comprises an extension portion extending along a side of the device body, the extension portion being located at the side of the device body or extending along the side of the device body to a surface of the device body facing away from the first display screen; and
   wherein the extension portion is provided with at least one through hole, and the second display screen is configured to slide relative to the device body to expose the at least one functional module from the at least one through hole.

4. The display device according to claim 1, wherein at least a portion of the second display screen is configured to outwardly slide beyond a side of the device body in parallel to the surface of the device body.

5. The display device according to claim 1, wherein the second region of the device body is provided with a camera module and a first fingerprint recognition module; and
   wherein the camera module and the first fingerprint recognition module are respectively disposed on two sides of the second region in a widthwise direction of the device body; or
   wherein the camera module and the first fingerprint recognition module are both disposed on one side of the second region in the widthwise direction of the device body; or
   wherein the camera module is disposed in a central area of the second region, and the first fingerprint recognition module is disposed on one side of the second region in the widthwise direction of the device body.

6. The display device according to claim 5, wherein the second region of the device body is further provided with a second fingerprint recognition module, and the second fingerprint recognition module is disposed at an end of the second region of the device body facing away from the first fingerprint recognition module.

7. The display device according to claim 6, wherein the first fingerprint recognition module and the second fingerprint recognition module are each selected from a capacitive fingerprint recognition module, an ultrasonic fingerprint recognition module and an optical fingerprint recognition module.

8. The display device according to claim 1, wherein a surface of the first display screen is flush with a surface of the second display screen.

9. The display device according to claim 1, wherein a size of the second display screen in a widthwise direction of the device body when being expanded in the widthwise direction is greater than a size of the device body in the widthwise direction.

10. The display device according to claim 1, wherein a stopping portion is provided on a surface of the device body facing away from the first display screen for blocking sliding of the second display screen.

* * * * *